United States Patent
Todo et al.

(10) Patent No.: US 6,600,554 B2
(45) Date of Patent: Jul. 29, 2003

(54) METHOD FOR DETECTING DEFECT OF OPTICAL FIBER

(75) Inventors: Shinpei Todo, Chiyoda-ku (JP); Yasuhiro Naka, Chiyoda-ku (JP); Akira Aikawa, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/929,483

(22) Filed: Aug. 15, 2001

(65) Prior Publication Data

US 2002/0054285 A1 May 9, 2002

Related U.S. Application Data

(63) Continuation of application No. PCT/JP00/08851, filed on Dec. 14, 2000.

(30) Foreign Application Priority Data

Dec. 16, 1999 (JP) ............................................ 11-358032

(51) Int. Cl.⁷ .............................................. G01N 21/00
(52) U.S. Cl. ...................................................... 356/73.1
(58) Field of Search ................................ 356/73.1, 338, 356/343, 369, 438, 342, 73, 496, 503, 432; 65/484, 425, 391, 392, 158, 435, 378; 385/12, 28, 96, 125; 250/227.29–227.31, 559.42–559.45, 390.11, 472.1, 483.1, 484.2, 484.3, 222.2; 438/689, 710, 788, 771, 776, 792, 798, 706–714; 436/500–518, 525, 527

(56) References Cited

FOREIGN PATENT DOCUMENTS

| JP | 261030741 A | * | 2/1986 |
| JP | 3-503937 | | 8/1991 |
| JP | 4-106448 | | 4/1992 |
| JP | 9-292305 | | 11/1997 |

* cited by examiner

Primary Examiner—Tu T. Nguyen
(74) Attorney, Agent, or Firm—Oblon, Spivak, McClelland, Maier & Neustadt, P.C.

(57) ABSTRACT

In defect detecting method for detecting defect of an optical fiber to be measured, in which a laser beam is illuminated onto an optical fiber to be measured from a direction transverse to an optical axis of the fiber to check intensity distribution of forward scattering light permeated through within the optical fiber and scattered, and the defect of the optical fiber to be measured is detected on the basis of a pattern of the intensity distribution, the pattern of the intensity distribution is subjected to a smoothing process having weak smoothness and a smoothing process having strong smoothness to form first and second patterns, respectively, and a judging pattern is formed on the basis of a difference or the quotient between the first and second patterns, and the defect of the optical fiber to be measured is detected by evaluating magnitude of the judging pattern. The pattern of the intensity distribution is subjected to Fourier transform to form a frequency spectrum pattern, and the frequency spectrum pattern is evaluated by using double logarithmic axis, and a judging curve having high contributing rate to the frequency spectrum pattern is applied to the frequency spectrum pattern to seek dispersion of the frequency spectrum pattern from the judging curve, and the defect of the optical fiber to be measured is detected on the basis of magnitude of the dispersion.

4 Claims, 9 Drawing Sheets

METHOD FOR DETECTING DEFECT OF OPTICAL FIBER

This is a continuation of International Application PCT/JP00/08851 with an international filing date of Dec. 14, 2000, published in Japanese under PCT Article 21(2) and now pending.

BACKGROUND OF THE INVENTION

FIELD OF THE INVENTION

The present invention relates to a defect detecting method for checking defect of an optical fiber, which is suitable for in-line inspection for inspecting an optical fiber during a drawing operation.

DESCRIPTION OF THE RELATED ART

If an optical fiber has internal defect such as cavity, it will result in undesired problems such as increase in light transmission loss and/or reduction of mechanical strength and/or poor end fusion between fibers. To cope with this, in optical fiber drawing equipment, such cavity defect has been detected in an in-line manner during a drawing operation.

For example, as disclosed in Japanese Patent Laid-open No. 4-106448 (1992) or as shown in FIG. 9A, there has been proposed a system in which, during the drawing operation, a raw optical fiber to be measured (referred to merely as "optical fiber to be measured" hereinafter) A is illuminated by a laser beam B from a lateral direction, and forward scattering light C passed through the optical fiber A and scattered forwardly is received by an image sensor D such as a CCD line sensor, and a signal from the sensor is processed in a signal processing portion E and a judgement processing portion F, thereby obtaining an intensity distribution pattern G of the forward scattering light C and detecting defect of the optical fiber A to be measured on the basis of the pattern G.

In the signal processing portion E, light intensity of the scattered light C received by the image sensor D is read out along a scanning line direction (as shown by the arrow a in FIG. 9A), thereby outputting the light intensity distribution pattern G. In this case, a laser beam B straightly emitted from a light source (not shown) (scattering light C having zero displacement angle) is received by the image sensor D at its central portion in the scanning line direction, and the scattering light C scattered by the optical fiber to be measured is received at both sides of the central portion of the sensor, so that, in a graph as shown in FIG. 9B having the ordinate indicating a sensor position co-ordinate (displacement angle of the scattering light) and the abscissa indicating light intensity, the intensity distribution pattern becomes a mountain-like pattern G having the peak in the vicinity of zero (0) sensor position co-ordinate.

In the judgement processing portion F, the intensity distribution pattern G caught by the image sensor D is compared with an intensity distribution pattern (reference pattern) of a normal (correct) optical fiber previously measured, and accord or discord between both patterns are judged on the basis of a certain threshold value, thereby determining whether the optical fiber A to be measured is normal or abnormal. In this case, the reference pattern is obtained from a pattern of the forward scattering light obtained by illuminating light onto an optical fiber which was already determined to have no defect by an appropriate method. Although the reference pattern may be obtained by examining intensity distribution patterns of forward scattering lights regarding a plurality of optical fibers judged as normality and by averaging the results, in any case, a fixed reference pattern is used.

In the on-line measurement during the drawing operation, the optical fiber A to be measured may be vibrated or the position of the fiber may be shifted or the outer diameter of the fiber is changed or the intensity of the laser beam is changed, with the result that various changing factors are added to the intensity distribution pattern G to actually be processed in the judgement processing portion F. For example, as shown in FIG. 10A, the pattern G is totally moved upwardly or downwardly, or, as shown in FIG. 10B, the pattern is totally moved to left or right, or, as shown in FIG. 10C, inclination of the pattern G is changed (in these Figures, only positive part or negative part of the pattern G regarding the zero (0) sensor position co-ordinate is illustrated). As a result, when the fixed reference pattern is used, even if the optical fiber A to be measured itself has no abnormality, there may be great difference between the reference pattern and the pattern G obtained from the measurement, with the result that it may be judged as abnormality. To avoid this, generally, in consideration of such external changing factors, a certain width (play) is given to the reference pattern so that, so long as the measured pattern G is within a certain range (within threshold value) of the reference pattern, the optical fiber A to be measured is judged as normality.

However, recently, it has been ascertained that, in some cases, such play overlooks defect which should naturally be detected. For example, in the sectional position of the optical fiber, if there is the defect in the vicinity of the core, the difference between the measured pattern and the reference pattern becomes smaller in comparison with a case where the defect exists remote from the core, with the result that the difference may be included within the play of the threshold value, and, thus, the measured pattern may be judged as normality, which should naturally be judged as abnormality. Accordingly, there is need for providing algorism eliminating the changing factors as shown in FIGS. 10A, 10B and 10C not relating to the defect of the optical fiber, thereby permitting the correct detection of abnormality of the optical fiber A to be measured.

Due to recent software and/or hardware development regarding the digital signal processing ability including image processing, the reference level can be changed to cancel the changing factors not relating to the defect of the optical fiber. However, since further increase in drawing speed in order to reduce the manufacturing cost of the optical fiber has still been requested and reduction in measurement period for detecting the defect has still been requested, even when highly accurate process capable of effecting judgement with high accuracy is used, if such a process has a long processing time, such a process will become meaningless. Accordingly, there is need for providing algorism in which burden of calculation required for the image processing is reduced and high speed processing can be achieved.

Further, if there is local offset in refractive index distribution or in intensity distribution of the measurement illuminating laser beam along the sectional direction of the optical fiber, during the on-line measurement, due to the vibration of the fiber, such offset may be detected in an enlarged scale. Accordingly, there is need for providing algorism which is not influenced by such local offset.

SUMMARY OF THE INVENTION

According to a first aspect of the present invention, in a defect detecting method for detecting defect of an optical fiber, in which a laser beam is illuminated onto an optical fiber to be measured from a direction transverse to an optical axis of the fiber to check intensity distribution of forward scattering light permeated through within the optical fiber and scattered, and the defect of the optical fiber to be measured is detected on the basis of a pattern of the intensity distribution, the method is characterized in that the pattern of the intensity distribution is subjected to a smoothing process having weak smoothness and a smoothing process having strong smoothness to form first and second patterns, respectively, and a judging pattern is formed on the basis of a difference between the first and second patterns, and the defect of the optical fiber to be measured is detected by evaluating magnitude of the judging pattern.

According to a second aspect of the present invention, in a defect detecting method for detecting defect of an optical fiber, in which a laser beam is illuminated onto an optical fiber to be measured from a direction transverse to an optical axis of the fiber to check intensity distribution of forward scattering light permeated through within the optical fiber and scattered, and the defect of the optical fiber to be measured is detected on the basis of a pattern of the intensity distribution, the method is characterized in that the pattern of the intensity distribution is subjected to a smoothing process having weak smoothness and a smoothing process having strong smoothness to form first and second patterns, respectively, and a judging pattern is formed by dividing the second pattern by the first pattern, and the defect of the optical fiber to be measured is detected by evaluating magnitude of the judging pattern.

According to a third aspect of the present invention, in a defect detecting method for detecting defect of an optical fiber, a change threshold pattern associated with the first and second patterns is formed, and the magnitude of the judging pattern is evaluated by comparing the threshold pattern with the judging pattern.

According to a fourth aspect of the present invention, in a defect detecting method for detecting defect of an optical fiber, a shift averaging method is used in the smoothing process.

According to a fifth aspect of the present invention, in a defect detecting method for detecting defect of an optical fiber, in which a laser beam is illuminated onto an optical fiber to be measured from a direction transverse to an optical axis of the fiber to check intensity distribution of forward scattering light permeated through within the optical fiber and scattered, and the defect of the optical fiber to be measured is detected on the basis of a pattern of the intensity distribution, the method is characterized in that the pattern of the intensity distribution is subjected to Fourier transform to form a Fourier transform pattern, and the Fourier transform pattern is evaluated by using double logarithmic axis, and a judging curve having high contributing rate to the Fourier transform pattern is applied to the Fourier transform pattern to seek dispersion of the Fourier transform pattern from the judging curve, and the defect of the optical fiber to be measured is detected on the basis of magnitude of the dispersion.

According to a sixth aspect of the present invention, in a defect detecting method for detecting defect of an optical fiber, the pattern of the intensity distribution is subjected to a smoothing process having weak smoothness and a smoothing process having strong smoothness to form first and second patterns, respectively, and an area where a difference between the first and second patterns becomes maximum or a value obtained by dividing the second pattern by the first pattern becomes maximum is set in the pattern, and the defect of the optical fiber to be measured is detected by partially applying Fourier transform to the area in the pattern.

BRIEF DESCRIPTION OF THE DRAWINGS

FIG. 2 is an explanatory view showing an intensity distribution pattern of scattering light observed by an image sensor of FIG. 1, where

Best Modes for Carrying Out the Present Invention
(First Embodiment)

Figure 1:
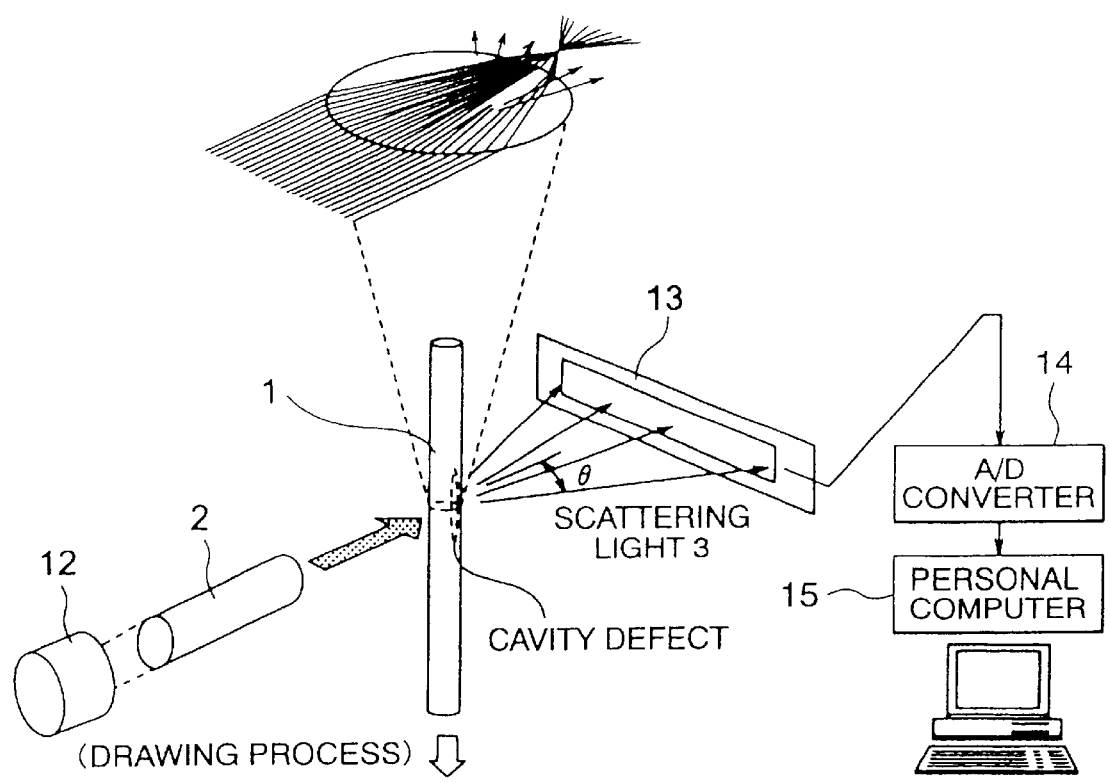
FIG. 1 is a schematic view showing a first example of a checking device to which an optical fiber defect detecting method according to the present invention is applied.

FIG. 1 is a schematic view of a device for carrying out an optical fiber defect detecting method according to the present invention. In FIG. 1, a light source 12 is disposed so that a laser beam 2 can be illuminated onto an optical fiber 1 to be measured (optical fiber blank wire) during a drawing operation from a direction transverse to an optical axis of the optical fiber, and an image sensor 13 is opposed to the light source 12 with the interposition of the optical fiber 1 to be measured. The laser beam 2 emitted from the light source 12 is permeated through within the optical fiber 1 to be measured and is scattered so that forward scattering light (referred to merely as "scattering light" hereinafter) is received by the image sensor 13. Incidentally, the laser beam 2 has a light ray width greater than a diameter of the optical fiber 1 to be measured and is emitted from the light source 12 continuously.

Figure 2A:
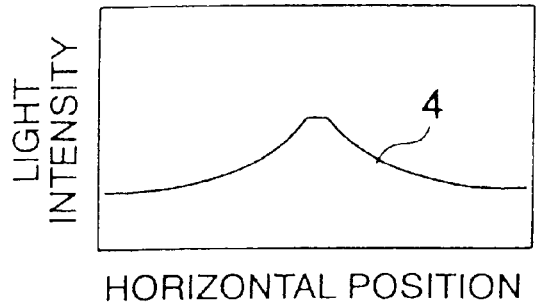
FIG. 2A shows a pattern regarding a normal optical fiber.
Figure 2B:
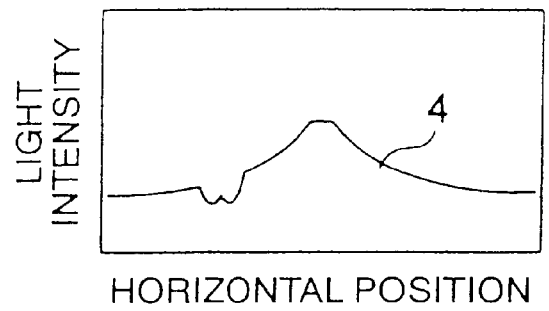
FIG. 2B shows a pattern regarding an abnormal optical fiber.

The image sensor 13 may be a CCD line sensor and, as shown in FIG. 1, it is designed to have a great horizontal width so that, when scanning is effected along the horizontal direction, light intensity distribution (in the horizontal direction) of the scattering light scattered by the optical fiber 1 to be measured can be detected by the sensor. Although the image sensor 13 may be disposed at a position where it is opposed to an optical axis of the incident laser beam from the light source 12, it can also be positioned within a range having an appropriate angle (light receiving angle) from that position. When signals from the image sensor 13 are plotted in a graph having the abscissa indicating a horizontal position (displacement angle of the scattering light 3) and the ordinate indicating light intensity, a mountain-like pattern 4 as shown in FIG. 2A or in FIG. 2B can be observed. If the optical fiber 1 to be measured is normal, as shown in FIG. 2A, a pattern 4 symmetrical (regarding left and right) in the horizontal direction, and, if there is abnormality, as shown in FIG. 2B, a pattern 4 having certain unevenness can be obtained.

The pattern 4 of the scattering light 3 caught by the image sensor 13 of FIG. 1 is sampled and is converted into a digital signal by an A/D converter 14 and the digital signal is inputted to a personal computer (PC) 15.

Figure 3:
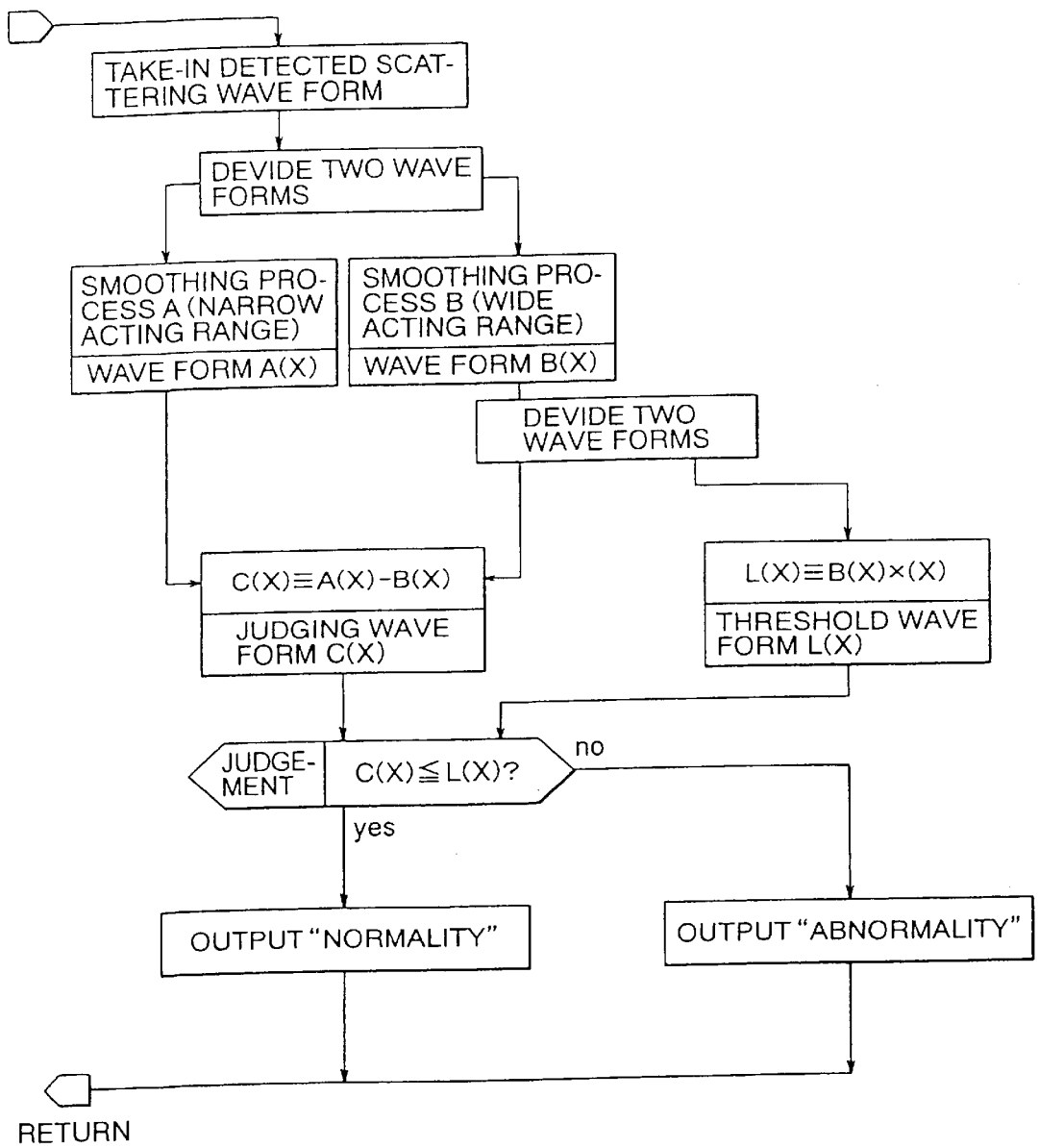
FIG. 3 is a flow chart showing a flow of the detecting method in the checking device of FIG. 1.

Software program for processing the inputted digital signal to carry out the optical fiber defect detecting method of the present invention is stored in the PC 15 of FIG. 1. FIG. 3 is a flow chart showing this software program. Whenever one-line scanning of the image sensor 13 is completed, a series processes shown in FIG. 3 is performed. Incidentally, the one-line scanning time of the image sensor 13 is selected to an appropriate value in dependence upon the drawing speed of the optical fiber 1 to be measured so that a section of the optical fiber 1 to be measured shifting at a high speed can be examined or checked at a predetermined interval.

Figure 4A:
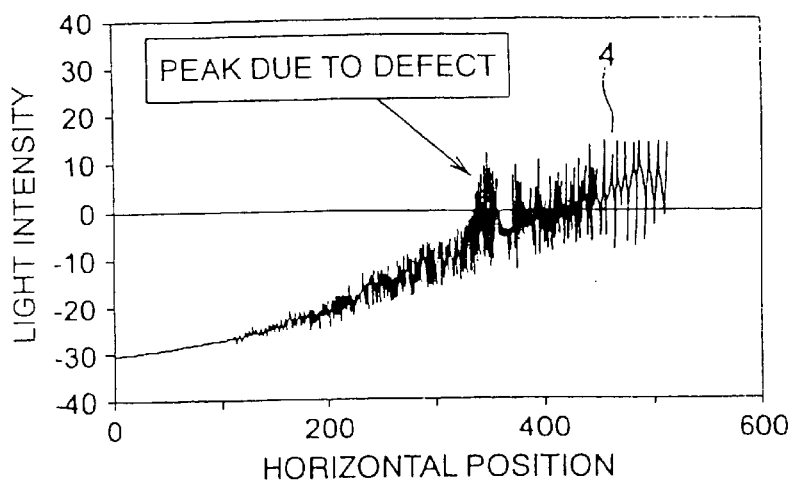
FIGS. 4A to 4C are explanatory views for explaining pattern judgement in the checking method of FIG. 3.
Figure 4B:
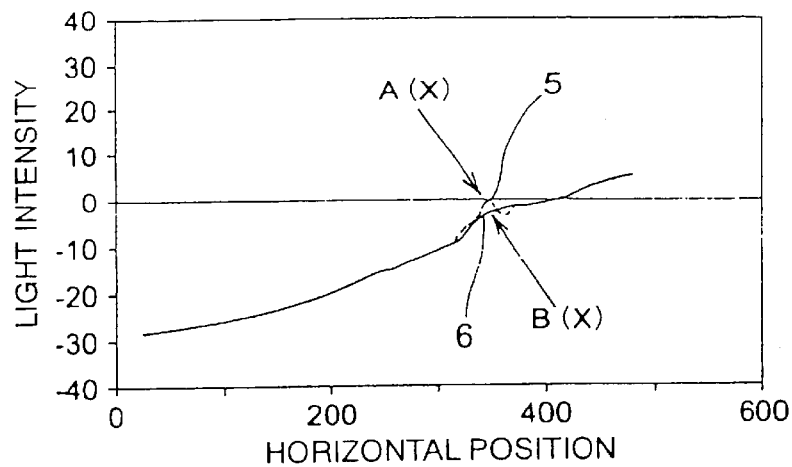
Figure 4C:
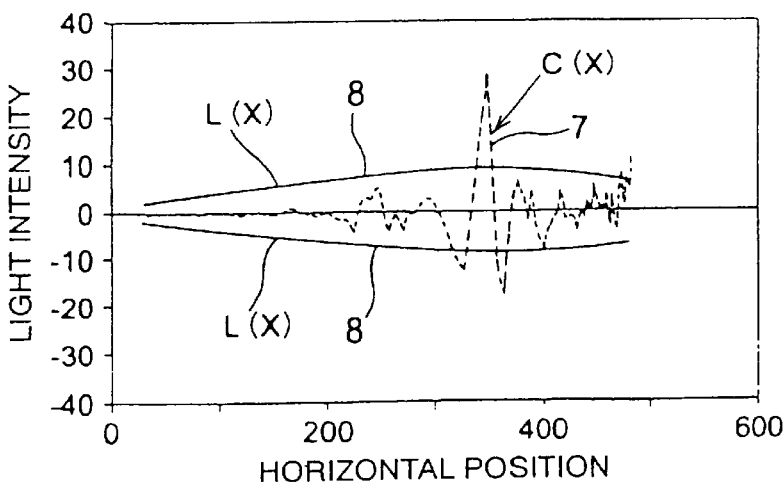

Next, the processing of the software program of FIG. 3 will be explained with reference to an example that a pattern 4 as shown in FIG. 4 was obtained. Incidentally, FIGS. 4A to 4C show only one-side halves of the actual patterns 4 caught by the image sensor 13. In the present invention, such one-side halves alone may be processed or the entire patterns as shown in FIGS. 2A and 2B may be processed.

(1) The digital signal inputted to the PC 15 is read-in, and a pattern 4 of light intensity distribution as shown in FIG. 4A is obtained. Although this pattern 4 includes abnormality caused by the defect of the optical fiber 1 to be measured, an abnormal position cannot be determined as it is.

(2) The read-in pattern 4 is duplicated to form two identical patterns 4 (copying of data).

(3) The duplicated pattern (one of patterns 4) is subjected to shift averaging processing for narrowing an effective range to components constituting that pattern 4, and the other pattern subjected to shift averaging processing for widening an effective range to components constituting that pattern 4, thereby obtaining a first pattern 5 (referred to as "pattern A(x)" hereinafter) and a second pattern 6 (referred to as "pattern B(x)" hereinafter) as shown in FIG. 4B. Incidentally, the shift averaging is one of smoothing processes and is represented by the following equation (1). In this case, the narrowing or widening of the effective range to the components mean to decrease or increase "n" in the equation (1). Further, in the equation (1), f(x) and f(i) indicates light intensities at component points x and i in a horizontal direction.

$$f(x) = \frac{1}{2n+1} \sum_{i=x-n}^{x+n} f(i) \qquad \text{Equation (1)}$$

(4) A difference between the pattern A(x) and the pattern B(x) is determined, thereby obtaining a judging pattern 7 (referred to as "judging pattern C(x)" hereinafter) as shown in FIG. 4C.

Judging pattern $C(x) = |\text{pattern } A(x) - \text{pattern } B(x)|$

In the processing in the above Item (4), the judging pattern C(x) may be obtained by the following equation:

Judging pattern $C(x) = |(\text{pattern } A(x))/(\text{pattern } B(x))|$

Although the latter reduces the burden for forming the judging pattern C(x), the former or the latter may be selected on the basis of a processing ability of the system.

(5) In parallel with the processing (4), the pattern B(x) is duplicated, and a change threshold value pattern 8 (referred to as "threshold pattern L(x)" hereinafter) is calculated by multiplying a pattern N(x) by the pattern B(x). The threshold pattern L(x) is proportional to the change in the pattern B(x). The pattern N(x) is sought experimentally in accordance with installation positions of the light source 12 and the image sensor 13 and a condition of a measuring system, and a pattern sought as an average expected value by measuring dispersion in a normal condition in the on-line measurement can be used.

(6) The judging pattern C(x) is compared with the threshold pattern L(x), so that, if at least a portion of the judging pattern C(x) exceeds the threshold pattern L(x), judgement as "abnormality" is outputted. If the judging pattern C(x) does not exceed the threshold pattern L(x), a judged result as "normality" is outputted.

(7) The processes from the above Item (1) to Item (6) are repeated, thereby detecting the defect of the optical fiber 1 to be measured during the drawing operation is detected in the in-line manner.

The PC 15 may have required functions such as a recording function for recording data received from the image sensor 13, a displaying function for displaying the pattern 4 and the like caught by the image sensor 13, an alarming function for informing the operator of the fact that the "abnormality" was detected and a function for automatically stopping the drawing device if the alarm is detected, as well as the function for processing the digital signal.

(Second Embodiment)

Figure 5:
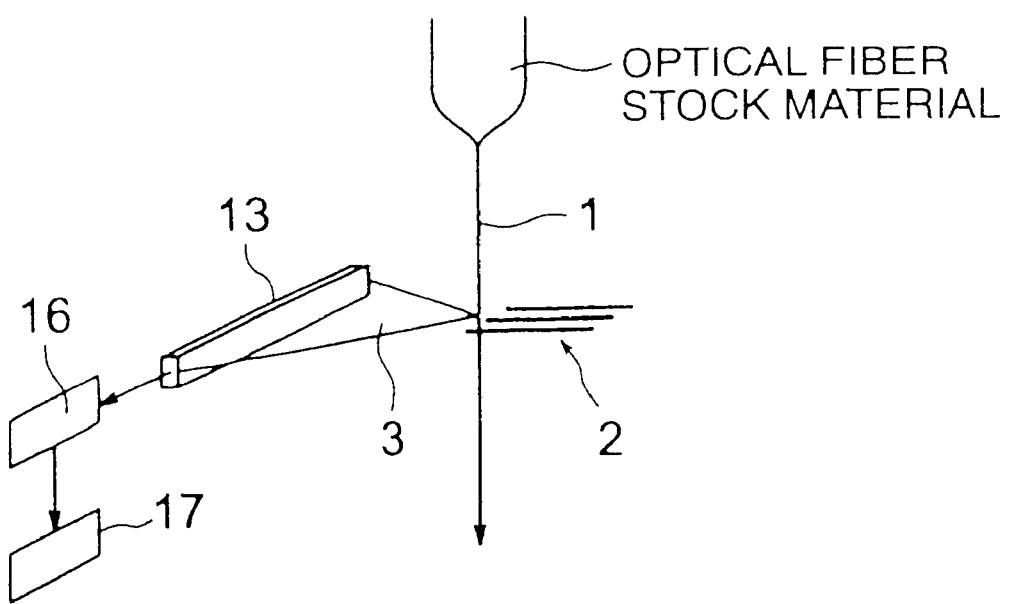
FIG. 5 is a schematic view showing a second example of a checking device to which an optical fiber defect detecting method according to the present invention is applied.
Figure 9A:
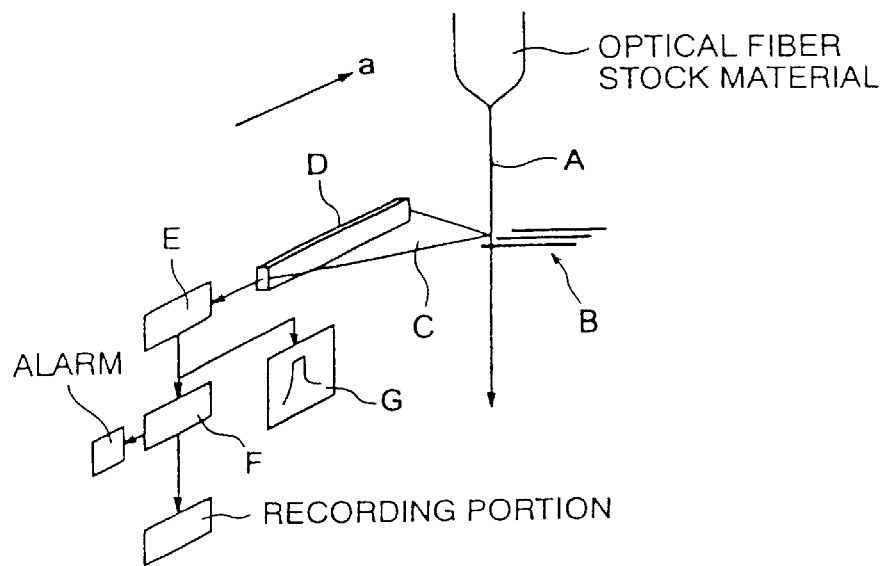
FIG. 9A is a schematic view showing an example of a conventional optical fiber defect detecting device.
Figure 9B:
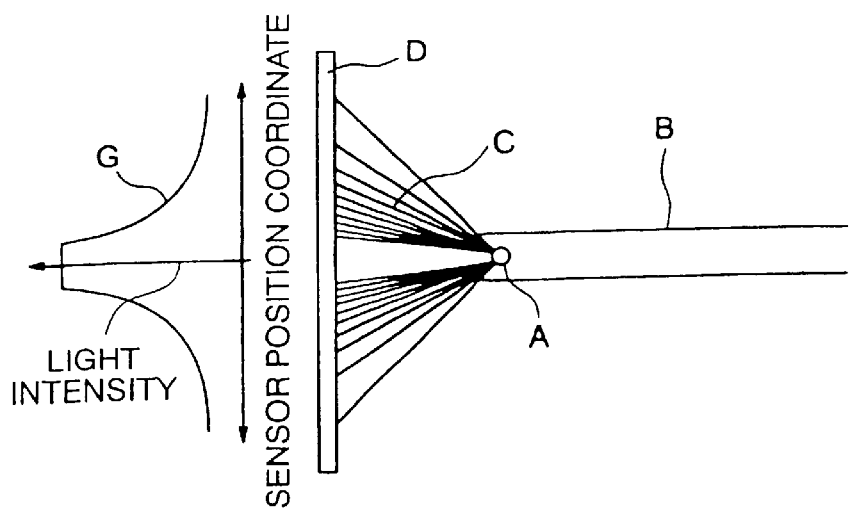
FIG. 9B is an explanatory view showing the state of scattering light observed by the device of FIG. 9A.
Figure 10A:
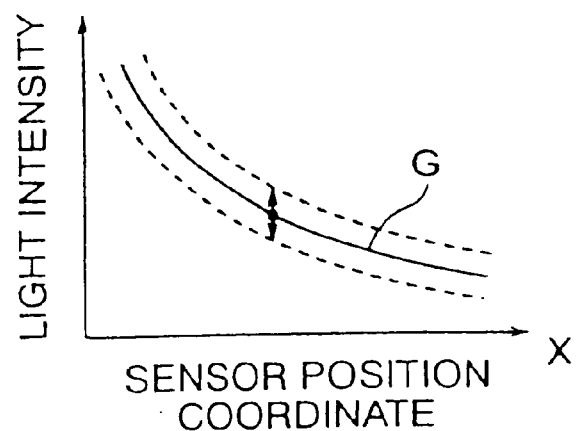
FIGS. 10A to 10C are explanatory views showing problems associated with the device of FIG. 9.
Figure 10B:
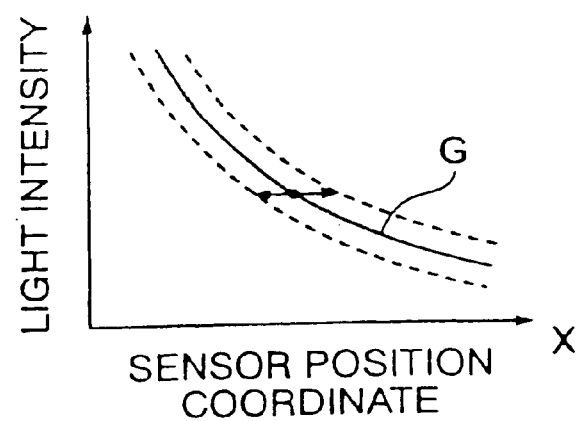
Figure 10C:
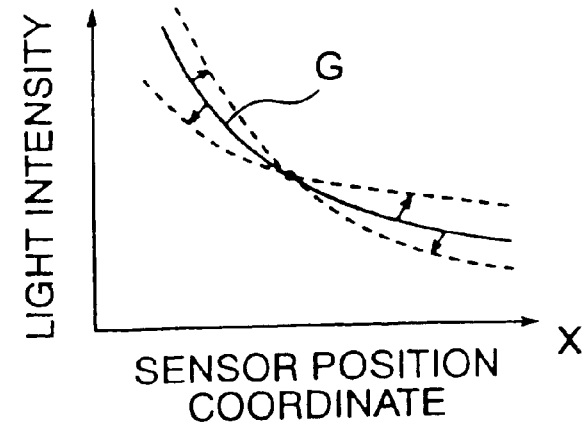

In the optical fiber defect detecting method according to the first embodiment, while an example that the pattern 4 of the light intensity distribution obtained by the image sensor 13 is converted into the digital signal and this digital signal is calculated and processed by the combination of the software program and the PC (personal computer) 15 was explained, in a second embodiment of the present invention, without using the software, the processing can be performed by using only hardware. In this case, a checking device can be constituted as shown in FIG. 5. The checking device shown in FIG. 5 includes a signal processing portion 16 and a judgement processing portion 17 similar to the checking device of FIG. 9, and the judgement processing portion 17 has a signal duplicating function, a smoothing process function, a judging pattern forming function, a threshold value generating function and a pattern judging function. Incidentally, in actual, in addition to these functions, the device can be include alarm, recording portion and a monitor, similar to FIG. 9.

The signal processing portion 16 serves to scan scanning lines of the image sensor 13 in a horizontal direction and to light intensity distribution of received scattering light 3 in a time-lapse manner, so that the pattern as shown in FIG. 2 can be obtained only by one line-scanning.

The signal duplicating function of the judgement processing portion 17 serves to branch or divide the pattern 4 outputted from the signal processing portion into two patterns to form two identical patterns 4. To achieve this, a branching circuit can be used.

The smoothing process function serves to effect smoothing processing to the two patterns 4 obtained by the signal duplicating function. More specifically, similar to the first embodiment, one of the patterns 4 is subjected to the smoothing process having weak smoothness to form the pattern A(x) and the other pattern 4 is subjected to the smoothing process having strong smoothness to form the pattern B(x). An integrating circuit can be used as a circuit for effecting the smoothing process, and degree of smoothness can be set on the basis of time constant of the circuit.

The judging pattern generating function serves to obtain a judging pattern identical to the judging pattern C(x) of the first embodiment by seeking difference or quotient from the patterns A(x), B(x) obtained by the smoothing process function.

The threshold value generating function serves to obtain a threshold pattern L(x) by multiplying another pattern value (corresponding to N(x) in the first embodiment) by the pattern B(x) having the strong smoothness.

The pattern judging function serves to compare the judging pattern C(x) with the threshold pattern L(x), so that, if at least a part of the judging pattern C(x) exceeds the threshold pattern L(x), "abnormality" is outputted, and, otherwise, "normality" is outputted.

(Third Embodiment)

Figure 8:
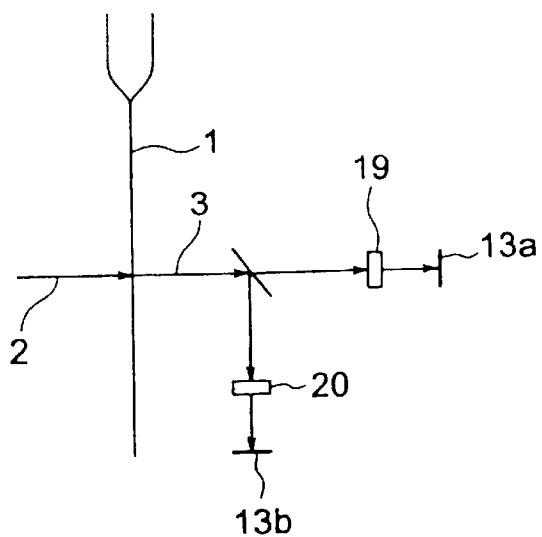
FIG. 8 is a schematic view showing a third example of a checking device to which an optical fiber defect detecting method according to the present invention is applied.

The optical fiber defect detecting method according to the present invention can be performed by an optical system as shown in FIG. 8. More specifically, scattering light 3 dispersed by an optical fiber 1 to be measured is branched or divided into two by a half mirror 18, and the divided light beams are observed by two different image sensors 13 (13a, 13b) through scattering plates 19, 20. In this case, the two scattering plates 19, 20 have different scattering degree, so that one becomes weak scattering degree and the other becomes strong scattering degree, with the result that a pattern A(x) similar to the first embodiment can be obtained from the scattering light 3 permeated through the former and received by the image sensor 13 and a pattern B(x) similar to the first embodiment can be obtained from the scattering light 3 permeated through the former and received by the image sensor 13. The patterns A(x), B(x) obtained by the two image sensors 13a, 13b is processed by the digital processing system explained in connection with the first embodiment or by the analogue processing system explained in connection with the second embodiment to seek a judging pattern C(x) and a threshold pattern L(x), and, normality or abnormality of the optical fiber 1 to be measured can be judged by comparing these two patterns.

(Fourth Embodiment)

Figure 6:
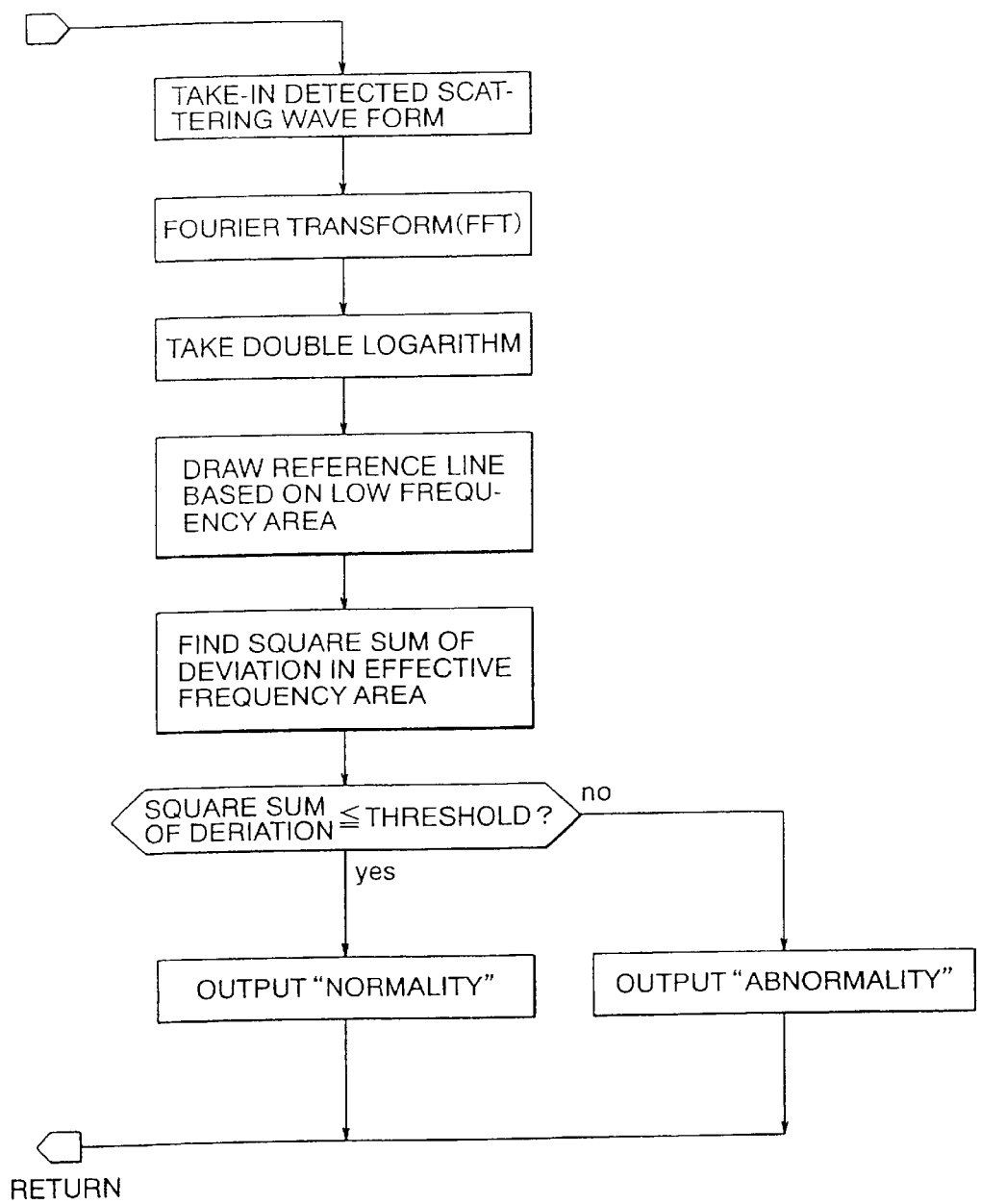
FIG. 6 is a flow chart for explaining a flow of processing when Fourier transform is used in the defect detecting method.

In the above explanations, while an example that the smoothing process is used in the optical fiber defect detecting method was explained, in the present invention, Fourier transform may be used. In this case, although a procedure from obtaining the intensity distribution pattern 4 of the scattering light 3 to the inputting the digital signal to the PC 15 is the same as the first embodiment, software program for processing the signal is used as shown in FIG. 6.

Now, a flow of the processing effected by the software program shown in FIG. 6 will be explained.

Figure 7:
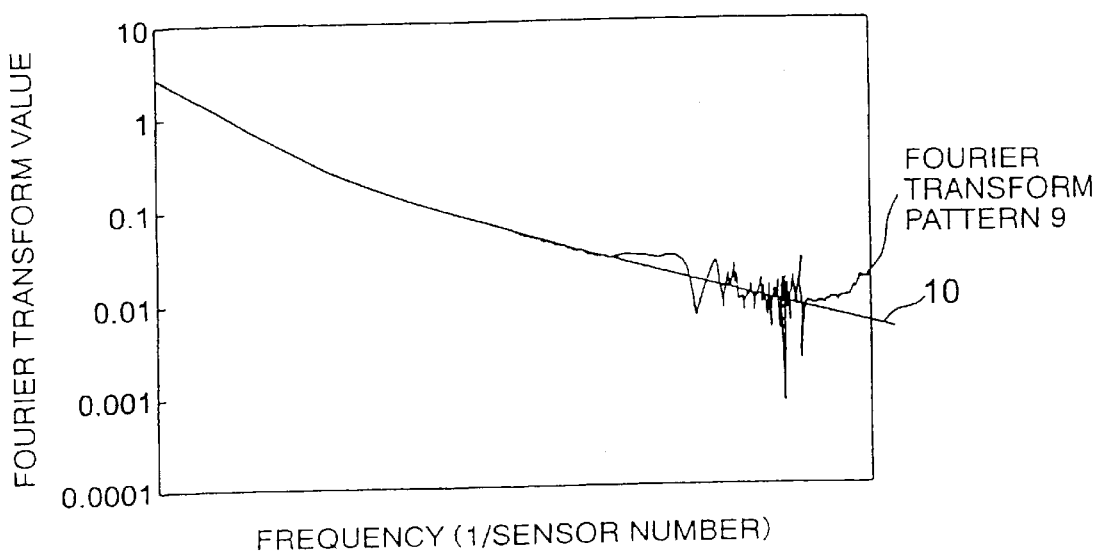
FIG. 7 is an explanatory views for explaining pattern judgement in the Fourier transform method of FIG. 6.

(1) A read-in pattern 4 is subjected to Fourier transform to obtain a Fourier transform pattern 9, and the Fourier transform pattern 9 is evaluated by a double logarithmic graph as shown in FIG. 7.

(2) A reference line (judging curve) 10 having a base point included in a low frequency area is drawn in the graph of FIG. 7. Although the drawing method is minutely differentiated in accordance with the installation position of the image sensor 13 and the other constructional element of the system, a straight line passing through a stable point at a low frequency area (for example, a point of 10 Hz) and having inclination of −1 can be applied.

(3) A square sum of deviation of the Fourier transform pattern 9 with respect to the reference line 10 is sought (dispersion is sought). In this case, an effective range is set in a frequency area, and, for example, a lower frequency side than a reference point may be omitted as out of effective range. Further, regarding the maximum frequency (determined by the number of date used in the Fourier transform), in a higher frequency band than (maximum frequency)/2, since an unstable condition is apt to occur, such a higher frequency band may also be omitted.

(4) A square sum of the sought deviation is compared with the threshold value, and, if the square sum is smaller than the threshold value, a "normal" result is outputted; whereas, if the square sum exceeds the threshold value, an "abnormal" result is outputted.

(5) By repeating the above processes (1) to (4), the on-line checking of the optical fiber 1 to be measured during the drawing operation can be performed.

All of the above-mentioned processes can be effected electronically by software program, and, for example, the reference line 10 is not manually applied to the Fourier transform pattern 9 of FIG. 7.

If it takes a long time for processing the Fourier transform in the PC 15, the process can be effected at a higher speed by seeking |A−B| or |A/B| from the pattern A(x) and the pattern B(x) explained in connection with the first embodiment and by selecting an area where these values become maximum (for example, in FIG. 4C, an area where the pattern C(x) has a maximum peak) and by carrying out the judging method using the program of FIG. 6 regarding this area. Although the Fourier transform can be calculation-processed efficiently by FFT (fast Fourier transform), also in this case, since the processing burden is greater in comparison with the shift averaging, the processing speed can be increased by defining or limiting the area.

Among the smoothing processes, there are a smoothing method in which the values at respective components are replaced by a central value (median) of values of peripheral areas, and a smoothing method in which, after the Fourier transform, components of higher frequency is made further smaller by a low band pass filter, and, thereafter, reversal Fourier transform is effected, as well as a smoothing method in which the values at respective components are replaced by an average value of values of peripheral areas.

Industrial Availability

According to the optical fiber defect detecting method according to the present invention, the following effects can be obtained.

1. Since the smoothing process in which processing such as shift averaging does not require long time is used as the algorism, even when the drawing speed is great, the on-line checking can be effected easily.

2. Since the smoothing process can be carried out easily by the electrical circuit and/or the optical system, the high speed checking is possible.

3. Since the threshold value can be changed to cancel the change in the optical fiber to be measured and change in the laser beam, the correct checking is possible.

4. Also in the checking method in which Fourier transform according to claim 5 is used, as defined in claim 6, since it is not required that the entire pattern be subjected to the Fourier transform, the high speed checking is possible.

What is claimed:

1. A defect detecting method for detecting defect of an optical fiber, in which a laser beam is illuminated onto the optical fiber to be measured from a direction transverse to an optical axis of said optical fiber to check intensity distribution of forward scattering light permeated through said optical fiber and scattered, and the defect of said optical fiber to be measured is detected on the basis of a pattern of the intensity distribution, comprising:

subjecting said pattern of the intensity distribution to a smoothing process having weak smoothness and a smoothing process having strong smoothness to form first and second patterns, respectively;

forming a judging pattern on the basis of a difference between said first and second patterns;

forming a change threshold pattern associated with said first and second patterns; and detecting the defect of said optical fiber to be measured by comparing said change threshold pattern with said judging pattern.

2. A defect detecting method for detecting defect of an optical fiber, in which a laser beam is illuminated onto the optical fiber to be measured from a direction transverse to an optical axis of said optical fiber to check intensity distribution of forward scattering light permeated through said optical fiber and scattered, and the defect of said optical fiber to be measured is detected on the basis of a pattern of the intensity distribution, comprising:

subjecting said pattern of the intensity distribution to a smoothing process having weak smoothness and a smoothing process having strong smoothness to form first and second patterns, respectively;

forming a judging pattern by dividing said second pattern by said first pattern;

forming a change threshold pattern associated with said first and second patterns; and detecting the defect of said optical fiber to be measured by comparing said change threshold pattern with said judging pattern.

3. An optical fiber defect detecting method according to claim 1 or 2, wherein the change threshold pattern associated with said first and second patterns is formed, and the magnitude of said judging pattern is evaluated by comparing said changed threshold pattern with said judging pattern.

4. An optical fiber defect detecting method according to any one of claims 1 or 2, wherein a shift averaging method is used in the smoothing processes.

* * * * *